UNITED STATES PATENT OFFICE.

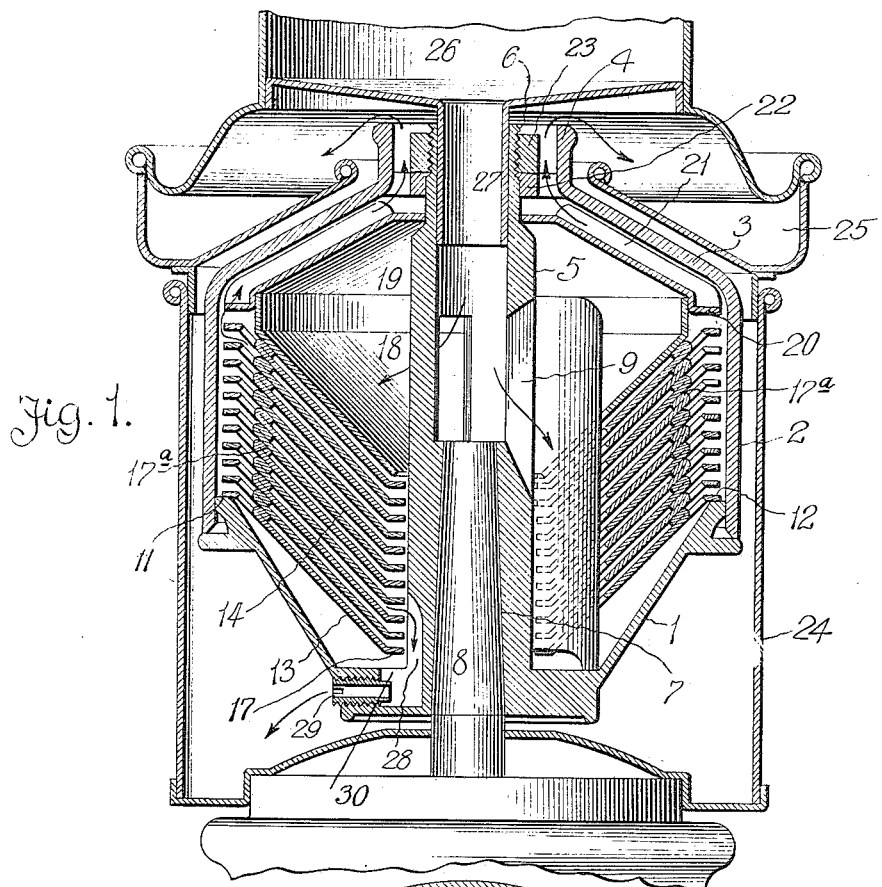
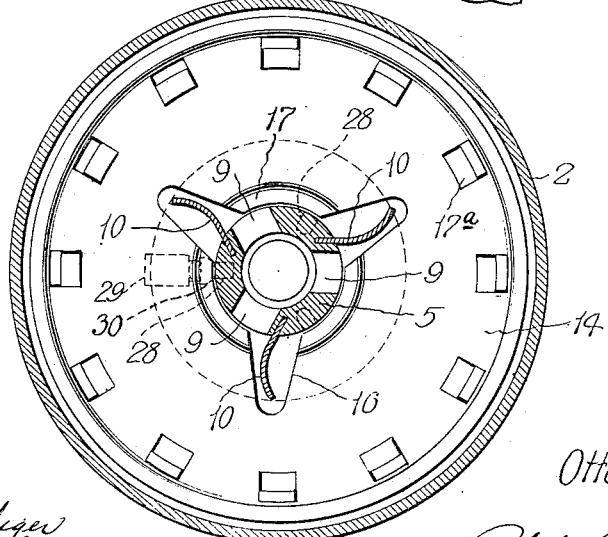

OTTO KRENKE, OF PORT HURON, MICHIGAN, ASSIGNOR TO ANKER HOLTH MANUFACTURING COMPANY, OF PORT HURON, MICHIGAN, A CORPORATION OF SOUTH DAKOTA.

CREAM-SEPARATOR.

1,298,058.     Specification of Letters Patent.     Patented Mar. 25, 1919.

Application filed September 10, 1917. Serial No. 190,669.

*To all whom it may concern:*

Be it known that I, OTTO KRENKE, a citizen of the United States of America, residing at Port Huron, in the county of St. Clair and State of Michigan, have invented certain new and useful Improvements in Cream-Separators, of which the following is a specification, reference being had therein to the accompanying drawings.

Cream separators are in use having a rotary bowl, a series of dished separator disks inside of and disposed transversely with respect to the bowl shell, the series of disks and the bowl shell being in operative engagement and adapted to resist the outward movement of each other and operate upon the material to be treated, together with means for properly balancing the bowl. The means heretofore employed has been lead or a soft metal placed on the inner sides of the bowl walls, the placing of the metal to properly balance the bowl being a manufacturer's operation. In consequence of this, it is impossible for the user of the cream separator to repair the same when the bowl has become unbalanced, which may occur, when one of the disks is lost, or the disks and bowl otherwise injured. Since the balancing of the bowl and disks depends on the number of disks employed, their symmetry, and other points beyond the attention of a dairyman or layman, it is necessary that the bowl and disk be returned to the manufacturer for proper balancing.

To obviate this and provide a bowl that is self balancing irrespective of any particular number of disks, is one of the principal objects of my invention, which is accomplished by having the disks self centering relative to the geometrical center or axes of said disks, without depending upon contact with the bowl hood. In consequence of this feature the disks are self-centering even without a bowl hood, therefore it is possible to make the bowl hood any desired diameter relative to the disks and to use a bowl that is entirely devoid of any lead or soft metal for centering or balancing purposes. Since the disks become automatically self centered relative to the center of the bowl, it is practically impossible for the bowl to become unbalanced, and this is a feature of my invention which I believe has never been attained in the cream separator art.

Another feature of my invention is the removal of cream by gravity so that the butter fat globules are unbroken and a high grade of cream obtained which is a desideratum by all dairymen. Heretofore, cream has been removed from the top of the separator and the effect of centrifugal force upon the cream is such as to break up and agitate butter fat to such extent that the cream loses its quality, that of having undisturbed globules of butter fat. This is accomplished by a novel arrangment of the self-centering disks, as there is sufficient clearance centrally of the disks for the cream to gravitate to the bottom of the bowl while there is sufficient clearance between the peripheral edges of the disks and the inner wall of the bowl for skimmed milk to be forced upwardly out of the top of the bowl.

Another feature of my invention is a dirt chamber in which the whole milk is placed. The dirt chamber is located in the top of the bowl above the disks and such dirt as may be within the milk is thrown outwardly against the wall of the dirt chamber, the dirt being collected on the chamber wall and is not carried off by the milk or cream, but should any of the dirt reach the disks it is carried by the skimmed milk and is lodged against the walls of the bowl. Since the dirt chamber, disks and bowl are all separable elements, the dirt chamber and bowl can be thoroughly cleansed and reassembled after each separting operation.

A still further feature of my invention is an adjustable outlet member for cream by which various grades of cream may be obtained by simply adjusting the outlet member. Since the cream in the lower part of the bowl is more or less subjected to centrifugal action, there is an annular wall of cream that varies in density or grade. For instance, the cream at the inner side of the wall will be of greater density than the cream at the outer side thereof, the cream tending to thin out by centrifugal force, consequently forming a wall having different strata of cream. By having an outlet member extending into this wall and adjustable relative thereto, it is possible to place the inner end of the outlet member in either strata of the cream wall and thus withdraw the desired grade of cream.

My invention also includes other novel features that will be apparent as the invention is better understood, and reference will now be had to the drawing, wherein—

Figure 1 is a vertical sectional view of the bowl of the separator, and

Fig. 2 is a horizontal sectional view of the same.

In the drawing, the reference numeral 1 denotes an inverted frusto-conical shaped base on which is mounted a detachable cylindrical bowl 2 having a breast portion 3 and a neck 4. Centrally of the base 1 and extending upwardly in the bowl 2 is a tubular shaft 5 having the upper end thereof reduced and exteriorly screwthreaded, as at 6. The lower part of the shaft 5 has the bore thereof tapered to receive a spindle 8 by which a rotary movement is imparted to the bowl, said spindle being driven by mechanism operated from a suitable source of power. The remaining portion of the shaft bore is cylindrical, and communicating therewith are slots 9 in the walls of the shaft 5, said slots being approximately 120 degrees apart with the side walls thereof parallel and the upper and lower walls diverging.

The shaft 5, adjacent the slots 9, has curved wings or accelerator blades 10, said blades being disposed longitudinally of the tubular shaft 5 and approximately 120 degrees apart. The base 1 affords an annular shoulder 11 and assuming that the bowl is not in operation, said shoulder supports the peripheral edges 12 of a lower separator disk 13 with similar disks 14 stacked thereon. Each disk is dished or inverted frusto-conical shaped with the lower ends or inner edges thereof terminating in lateral flanges 17 and the flanges and lower ends thereof slotted, as at 16, to receive the accelerator blades 10. The walls of the slots 16 are adapted to be engaged by the blades in order that a rotary movement may be imparted to the disks 13 and 14, but the slots 16 are of such size and shape that said disks may readily self center relative to the tubular shaft 5. In other words the disks may have a lateral movement relative to each other and thus find positions having a true geometrical center represented by the tubular shaft 5. To permit of such shifting of the disks, each disk, in proximity to its peripheral edge, has a plurality of circumferentially arranged spacing lugs 17ᵃ which are preferably formed by cutting and stamping the disks to form the lugs and bending the lugs back on to the disks. The lugs will therefore maintain the disks in spaced or superposed relation and except for the lugs 17ᵃ there are unobstructed passages between the disks and as milk is delivered at the inner edges or lower end of the uppermost disk, it may flow downwardly to some of the lowermost disks. Such milk which is not separated from cream during the downward movement or flow is caused to pass outward and upward between the disks and is thoroughly treated or separated by the time it reaches the outer edges of said disks.

By reference to Fig. 2, it will be noted that the lower end or inner edges of the disks 13 and 14 will contact with the walls of the tubular shaft 5 before it contacts with the inner walls of the bowl hood and as a matter of fact, it is impossible for the disks to contact with said bowl hood, as the movement is limited by the tubular shaft. The movement of the disks however, is not limited to the extent that said disks cannot find the proper balance within the bowl, but the tubular shaft does constitute means about which the disks may self-center and become properly balanced independent of the bowl hood 2.

Above the disks 14 is a conical bottom 18 of the dirt chamber, said dirt chamber having a conical top 19 provided with a peripheral flange 20 spaced from the peripheral edge 12 of the uppermost disk 14. The conical top 19 of the dirt chamber rests on the reduced upper end of the tubular shaft 5 and said conical top has a plurality of deflectors 21 adapted to act somewhat as a propeller in causing skimmed milk to flow on the conical top 19.

In the neck 4 of the bowl is a spider 22 fitting on the reduced end of the tubular shaft 5, and a nut 23 is screwed on the reduced end of the shaft against the spider 22, to hold the base 1 and the bowl assembled with the disks and dirt chamber therein.

The bowl 4 is inclosed by a suitable casing 24 and the upper part of the casing provides a skimmed milk chamber 25 and a reservoir or receptacle 26 for whole milk. The reservoir or receptacle 26 has a down pipe 27 extending into the cylindrical bore of the tubular shaft 5, so that the whole milk may readily flow into the shaft, through the slots 9, and into the dirt chamber where it finds its way downwardly between the disks and said tubular shaft. As pointed out in the beginning, such dirt carried into the dirt chamber by the whole milk will be thrown against the side walls of the dirt chamber to collect thereon and as the dirt chamber is formed of two separatable parts, said chamber can be easily and quickly cleaned after cessation in the operation of the machine.

The lower end of the tubular shaft at its juncture with the base 1 has a plurality of drain grooves 28 and one of said grooves has an opening 30 into which extends an adjustable tubular cream outlet member 29, preferably in the form of a screw that may be minutely adjusted to correctly position the inner end thereof in the opening 30.

When the bowl is rapidly revolved, centrifugal force causes the disks within the bowl to become properly balanced therein, the disks being self adjusting. Whole milk is admitted at the slots 9 to flow between the inner edges of the disks and the tubular shaft 5 and as the milk encounters the spaces between said disks, centrifugal force disseminates the milk causing it to travel outwardly and upwardly between the disks. It is during such gyratory movement of the milk that the heavy and light parts thereof are separated, the heavy parts being discharged at the peripheral edges of the disks to be carried upwardly over the top 19 of the dirt chamber, through the spider 22 and discharged from the neck 4 into the chamber 25 where it is carried off by a suitable spout (not shown). The light part of the milk will flow by gravity toward the base of the bowl, but the centrifugal force is such that the cream is held outward from the drain grooves and presents an annular cream wall at the opening 30. Cream will naturally enter said opening and by adjusting the outlet member 29, the inner end thereof may be shifted relative to the cream wall and it is in this manner that different grades of cream may be skimmed from the milk by simply adjusting said member. It is obvious that the wall of cream maintained by centrifugal force in the lower end of the bowl will be made up of what may be considered different strata of cream, the thick or high grade of cream forming the innermost strata of the wall and the thin or low grade of cream forming the outer strata of the wall. It is therefore possible to adjust the outlet member 29 so that the inner end thereof will extend into a desired strata of the wall and remove the grade of cream desired.

It is thought that the operation and utility of my invention will be apparent without further description and while in the drawing there is illustrated a preferred embodiment of my invention, it is to be understood that the structural elements are susceptible to such changes, in size, shape and manner of assemblage, as fall within the scope of the appended claim.

What I claim is:

In a cream separator, a rotary bowl devoid of balancing material, superposed separating disks in said bowl, and means centrally of said bowl about which said disks have a limited movement maintaining the peripheral edges of said disks out of contact with said bowl hood, and adapted to allow said disks to self-balance relative to said bowl.

In witness whereof I affix my signature in the presence of two witnesses.

OTTO KRENKE.

Witnesses:
   D. D. BROWN,
   E. L. POWERS.